United States Patent

Ambli

[15] 3,663,053
[45] May 16, 1972

[54] SPLIT HEADER FOR OPEN TOP TRUCKS

[72] Inventor: Andrew Ambli, 2376 North Hamline, St. Paul, Minn. 55113

[22] Filed: Aug. 7, 1970

[21] Appl. No.: 62,026

[52] U.S. Cl. .................................296/40, 24/68, 74/105, 74/527, 296/100
[51] Int. Cl. ........................................B60r 27/00
[58] Field of Search ...................296/40, 104, 100; 280/153; 74/105, 527; 24/68, 71.3, 270, 273; 292/113, 118, 246, 247, 248, 249, 250, 305

[56] References Cited

UNITED STATES PATENTS

| | | | |
|---|---|---|---|
| 2,955,874 | 10/1960 | Brindley | 296/40 X |
| 2,741,507 | 4/1956 | Ambli | 296/40 |
| 2,866,652 | 12/1958 | Schatzman | 280/153 |
| 2,450,589 | 10/1948 | Falk et al. | 296/40 |
| 2,761,698 | 9/1956 | Schatzman | 280/153 |
| 3,368,711 | 2/1968 | Dubo | 292/247 X |
| 2,616,721 | 11/1952 | Schatzman | 280/153 |

*Primary Examiner*—Benjamin Hersh
*Assistant Examiner*—Leslie J. Paperner
*Attorney*—Williamson, Palmatier & Bains

[57] ABSTRACT

A split header assembly to enable a man standing on the floor of a truck to draw inward and interconnect the upper rear sides of a high open top truck so the truck's rear doors can be closed, aligned, and locked. A latch mechanism mounted on two header sections which are swingably mounted to the rear corner posts of the truck sides, has a lever arranged for upward and downward swinging movement. The lever moves a pair of latch bars on one header section into and out of locking engagement with a pair of keepers on the other header section to draw the header sections inward and retain them.

3 Claims, 3 Drawing Figures

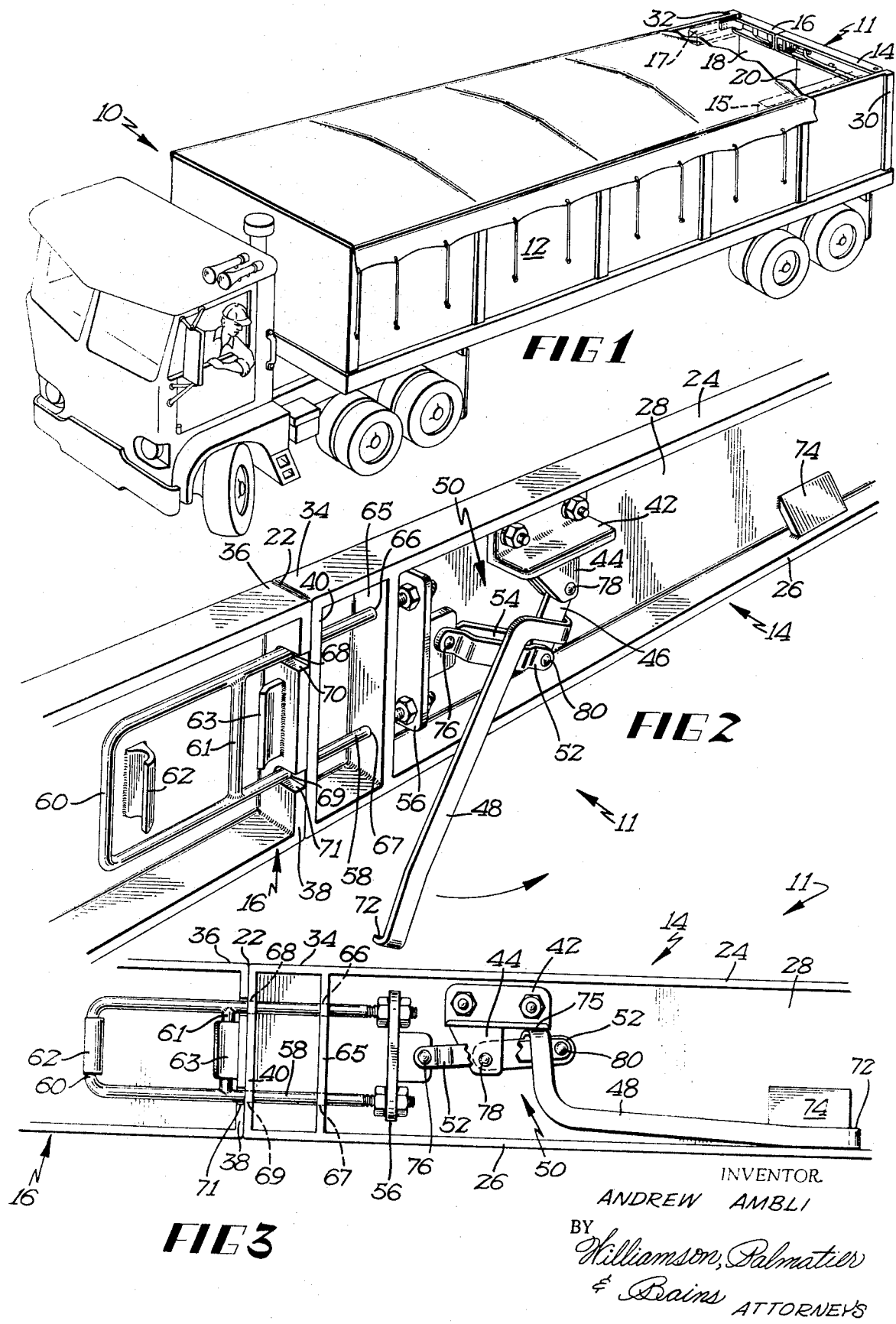

SPLIT HEADER FOR OPEN TOP TRUCKS

BACKGROUND OF THE INVENTION

This invention relates to high open top truck vans where a heavy rigid transverse header is required to interconnect the sides of the van in order to complete and form a rigid frame at the rear of the van for support, alignment, and locking of the rear doors of the van. When heavy loads are placed within a truck van, they often exert large forces against the sides of the van causing them to bow outward. To close the rear doors of a heavily loaded van, the sides of the van must first be returned to normal unbowed positions in order to align the doors and engage the locks associated with the doors. A split header assembly has been used at the rear of the van to interconnect the truck sides and return them to unbowed positions as shown in my U.S. Pat. No. 2,741,507, issued Apr. 10, 1956 for Split Header for Open Top Truck Trailers and the Like. The patent discloses a pair of header sections which can be interconnected and locked in position by a hook-like latch mechanism operated by moving a lever horizontally from an open to a locked position.

Since the formulation of the invention shown in the said patent the height of truck vans has increased considerably and not infrequently may be as much as 6 or 7 feet from the truck floor to top.

The large force necessary to draw the headers together when the heavy loads bowed the truck sides outward required a strenuous effort by an operator in order to move the horizontal swinging lever from open to locked position. To operated the latching mechanism shown in the said patent an operator standing on the floor of the van often had to reach high above his head to reach the lever and then exert a considerable horizontal force to move the lever to a locked position to draw together and lock the header sections. Reaching and applying the necessary force to a lever above the head of the operator was a burdensome and often injury producing operation.

SUMMARY OF THE INVENTION

My invention comprises a pair of split header sections with an improved latching system thereon affording fast, smooth operation and greater safety for an operator. A lever is mounted on one of the header sections for upward and downward swinging movement. An operator standing on the floor of the truck van can pull the header sections inward and rigidly lock them together by moving the lever upward against the header. Since it is often necessary to exert a large force to lock a pair of headers, an upward swinging lever movement is desirable because it eliminates the burdensome and often strenuous former practice of pushing horizontally against a lever located above the operator's head. Means are provided to retain the lever against the header to thereby avoid any accidental collision between operator and a downward hanging lever.

Because of the great strain placed upon split header sections by heavily loaded truck vans, it is important that the latch be extremely sturdy and reliable. To prevent accidental separation of the headers while traveling, my latch has been improved and strengthed by the addition of a pair of latch bars and a pair of cooperating keepers. The latched header assembly also provides support for a tarpaulin stretched over the van for cargo protection.

BRIEF DESCRIPTION OF THE DRAWINGS

FIG. 1 is a pictorial drawing of a truck embodying my split header assembly invention.

FIG. 2 is an isometric drawing of a pair of split headers showing the detailed construction of my latch mechanism when the latch is in open position.

FIG. 3 is a front elevational view of the split header assembly of FIG. 2 showing the latch in locked position with part of the linkage broken away for simplification.

DESCRIPTION AND OPERATION OF THE INVENTION

FIG. 1 shows an open top truck 10 with a high van 12 equipped with a split header assembly 11 embodying my invention. A first split header section 14 is shown rigidly locked to a second split header section 16. The truck has horizontally swinging rear doors 18 and 20 which are provided with locks which secure the doors to the header assembly 11 and the truck body. When these split header sections are not needed for structural support, as for example when the truck is being loaded or unloaded, the sections can be unlocked and swung against opposite sides of the van as illustrated by dashed lines at 15 and 17. Ordinarily the header sections have two different lengths to thereby provide greater structural rigidity at the center of the van. Because of the heavy loads often transported in trucks of this kind, and the resulting deformation of the truck sides, it is usually necessary to exert a large force to pull the header sections 14 and 16 together. Since trucks of this kind often have the headers 6 and 7 feet above the floor of the truck van it is desirable that the header latch mechanism be operable by a man standing on the floor of the truck with a minimum of exertion and strain.

Referring now to FIGS. 2 and 3 which show the split header assembly 11 of FIG. 1 in further detail, a first header section 14 abuts against a second header section 16 at junction 22. The first header section 14 includes an upper supporting member 24, a lower supporting member 26, and a sheet member 28 connecting the upper and lower supporting members. The second header section 16 is similarly constructed. The outer end of each header section is pivotally mounted to the side of the truck at corner posts 30 and 32 (FIG. 1), and the inner ends 34 and 36 (FIGS. 2 and 3) abut at a junction 22 to thereby permit a substantially straight continuous header to be formed when the sections are interconnected. The first and second header sections have their inner ends provided with abutment plates 38 and 40, respectively, which are welded to the members making up each header section.

One header section, here shown as first header section 14, is provided with a lever mounting bracket 42 secured to the header 14 by a pair of bolts and cooperating nuts or other fastening means. The lever mounting bracket 42 has a bifurcated portion 44 constructed to receive an end 46 to lever 48 such that lever 48 is pendently hung from the bifurcated portion, permitting an operator standing on the floor of the truck to have easy access to the lever 48.

A swinging linkage 50 consisting of a pair of linking elements 52 and 54 pivotally connects lever 48 to a slide 56 of latch frame 58.

The latch frame 58 includes the slide 56, U-shaped latch bar 60 which is threadedly connected to slide 56, and second latch bar 61 which is welded to first latch bar 60. A pair of keepers 62 and 63 are fastened to second header section 16 in any known manner and cooperate with latch bars 60 and 61, respectively, to interconnect and draw inward the sides of the truck when lever 48 is moved to a locked position and will be further described hereafter. The latch frame 58 is shown in an unlocked or open position in FIG. 2.

Guides are provided on header sections 14 and 16 to direct the latch bars into engagement with the keepers. The first header section 14 has a guide plate 65 provided with a pair of bores, 66 and 67, to slideably receive latch bar 60. Abutment plate 40 has a like set of bores 68 and 69 (FIG. 3) which serve as guides. Abutment plate 40 and guide plate 65 with their bores serve as guides on the first header section. The second header section has an abutment plate 38 with a pair of channels 70 and 71 therein (FIG. 2); the abutment plate with its channels serves as a guide on the second header section.

The free end of lever 48 has a portion 72 constructed and arranged to rest on the lower support member 26 of said first header 14 when the lever is in a locked position. The first header is provided with a lever supporting plate 74 which is mounted obliquely between the sheet member and the lower supporting member of the first header section. The free end of lever 48 is turned sharply inward at 72 toward the first header section 14 so that the turned portion 72 fits around lever supporting plate 74 as shown at FIG. 3 when the lever is in locked position. It is important that the end of lever 48 rest on the lower support member 26 to prevent lever 48 from hanging downward at any time when the handle is not in use to avoid collision between lever and operator.

Moving lever 48 from the pendent open position shown in FIG. 2 to the locked position of FIG. 3 pulls latch frame 58 toward lever mounting bracket 42. Since latch bars 60 and 61 engage keepers 62 and 53, respectively, second header section 16 is drawn toward first header section 14. When in a locked position lever 48 rests against lever mounting bracket 42 at 75 (FIG. 3), and it should be noted that the lever has an overdead-center relationship with pins 76 and 78 whereby the pin 80 joining swinging linkage 50 to lever 48 is above the line of centers joining the pins 76 and 78. This construction insures a firm locking action for the latch mechanism.

In operation when it is necessary to interconnect and draw together the split header sections at the rear of the van, the operator first aligns the header sections and manipulates the latch bars 60 and 61 into alignment with keepers 62 and 63, respectively, and then moves fast operating lever 48 upward along the path indicated by the arrow of FIG. 2 to its locked position. The latch bars 60 and 61 cooperate with keepers 62 and 63 respectively to draw together, align, and rigidly interconnect the header sections 14 and 16 thus providing a sturdy frame to which the rear van doors can be locked. This simple operation securely latches header sections 14 and 16 together and retains them until the lever 48 is moved to an open position. As an operator moves lever 48 to a locked position he must spring the lever 48 outward slightly from member 26 so the turned portion 72 of the lever 48 clears member 26. The springing operation is repeated when the lever is moved to an open position. When the lever 48 has moved to its locked position, turned portion 72 rests solidly on lower supporting member 26 and the turned portion 72 of the lever fits about lever supporting plate 74. This rest position insures that the lever will not accidentally swing to a pendent open position. Since men are often loading or unloading the truck van, it is important that heavy levers of the type used herein are not free to fall upon them. The lever supporting plate 74, against which the lever rests also provides a convenient location at which a worker can take hold of lever 48 before springing it outward slightly from member 26 and swinging the lever downward to unlock the header assembly.

While I have described a preferred embodiment of the present invention, it should be understood that various changes, adaptations and modifications may be made therein without departing from the spirit of the invention and the scope of the appended claims.

I claim:

1. A split header assembly for interconnecting and drawing inward the sides of an open top truck where the header is located above the height of a man standing on the floor of the truck and where interconnecting the truck sides requires application of great force comprising:

first and second header sections, an outer end of each section mounted on opposite sides of the truck for swinging movement in a horizontal plane, the inner ends of the sections abutting to thereby permit a substantially straight continuous header to be formed when said sections are interconnected;

a latching mechanism constructed and arranged to draw together and retain said header sections, including a lever mounted for upward and downward swinging movement accessible to a man standing on the floor of the truck, said lever being swingable upward to a locked position against said first header section to operate said latching mechanism to interconnect and draw together said header sections and including a pair of latch bars slidably mounted to said first header section and a pair of keepers on said second header section constructed and arranged to cooperate with said latch bars to rigidly, but releasably, secure the inner ends of said header sections together when said lever is moved to a locked position, the latching mechanism further including a slide and a swinging linkage, said linkage pivotally connected between the slide and lever and cooperating with the lever to draw the latch bars into locking engagement with the keepers, the linkage swinging to an over-dead-center relationship with the pivots as the latch bars engage the keepers in order to restrain the lever against reverse swinging and maintain the engagement between latch bars and keepers.

2. The combination according to claim 1 wherein said pair of latch bars includes a first U shaped latch bar and a second substantially straight latch bar, the said straight latch bar being rigidly affixed between the arms of the U shaped bar at right angles thereto.

3. A split header assembly for interconnecting and drawing inward the sides of an open top truck where the header is located above the height of a man standing on the floor of the truck and where interconnecting the truck sides requires application of great force comprising:

first and second header sections, an outer end of each section mounted on opposite sides of the truck for swinging movement in a horizontal plane, the inner ends of the sections abutting to thereby permit a substantially straight continuous header to be formed when said sections are interconnected;

a latch frame including a pair of latch bars;

a lever mounted to said first header section for upward and downward swinging movement, said lever connected through a linkage to said latch frame;

a pair of keepers on said second header section constructed and arranged to cooperate with said latch bars to rigidly, but releasably, secure the inner ends of said header sections together;

guides on said first header section guiding said latch bars of said latch frame into locking engagement with said pair of keepers when said lever is swung upward against said first header to a locked position and out of locking engagement when said lever is swung downward to a pendent open position;

said first header section including upper and lower supporting members and a sheet member connecting said upper and lower supporting members;

a lever supporting plate mounted obliquely between said sheet member and said lower supporting member;

said lever having a portion adjacent the free end thereof constructed and arranged to rest on said lower support member and against said lever supporting plate when said lever is in a locked position, the free end of said lever being turned sharply inward toward said first header to prevent the lever from accidently swinging downward from a locked to an open position.

* * * * *